US005264732A

United States Patent [19]

Fiorina et al.

[11] Patent Number: 5,264,732

[45] Date of Patent: Nov. 23, 1993

[54] A.C. ELECTRICAL POWER SUPPLY SYSTEM WITH A BACK-UP POWER SUPPLY

[75] Inventors: Jean-Noël Fiorina, Seyssinet-Pariset; Dominique Amen, Grenoble, both of France

[73] Assignee: Merlin Gerin, France

[21] Appl. No.: 765,056

[22] Filed: Sep. 24, 1991

[30] Foreign Application Priority Data

Oct. 8, 1990 [FR] France ............................ 90 12476

[51] Int. Cl.⁵ ............................ H02J 9/00

[52] U.S. Cl. ............................ 307/66; 307/64; 307/87

[58] Field of Search ............................ 307/43, 64, 66, 80, 307/85, 86, 87

[56] References Cited

U.S. PATENT DOCUMENTS 4,065,711 12/1977 Kawabata ............................ 320/14
4,473,756 9/1984 Brigden et al. ............................ 307/66
4,782,241 11/1988 Baker et al. ............................ 307/66
4,866,295 9/1989 Leventis et al. ............................ 307/66
4,935,861 6/1990 Johnson, Jr. et al. ............................ 363/132

FOREIGN PATENT DOCUMENTS 0074910 3/1983 European Pat. Off. .
8901256 2/1989 World Int. Prop. O. .

*Primary Examiner*—Jeffrey A. Gaffin
*Attorney, Agent, or Firm*—Parkhurst, Wendel & Rossi

[57] ABSTRACT

An auxiliary generator supplies a sinusoidal voltage of fixed amplitude adjusted in phase to the mains supply voltage. A comparator, followed by a threshold circuit and a bistable switch, enables a static contactor to be opened almost instantaneously when the difference between the voltages of the mains supply and of the generator exceeds a certain preset value. Power is then supplied by an auxiliary back-up power supply.

7 Claims, 2 Drawing Sheets

MAINS POWER SUPPLY
Vr
9
1
VOLTAGE GENERATOR
11
Vref
12
15
16
THRESHOLD
Vd
17
Vr
13
7
8
AND
10
18
S
R
A
4
3
30
31
19
34
AND
CONTROL CIRCUIT
29
6
5
Vm
24
20
AMPLITUDE MEASURING CIRCUIT
22
25
23
21
33
BATTERY BANK
32
27
26
Vref
PHASE COMP.
28
Vr
LOAD
2

A.C. ELECTRICAL POWER SUPPLY SYSTEM WITH A BACK-UP POWER SUPPLY

BACKGROUND OF THE INVENTION

The present invention relates to a power supply system supplying a load with single or multiphase AC electrical power, from a mains power supply, the system comprises an auxiliary back-up power supply capable of replacing the main power supply, in the event of failure of the latter, a static contactor located between the load and the mains power supply, a detection device for detecting almost instantaneously when the mains power supply goes outside preset tolerances and for controlling the opening of the static contactor, and means for detecting the return of the mains power supply to within said tolerances.

It is state of the art to use a bank of batteries operating an inverter as back-up power supply. A static contactor, which is placed between the normal mains power supply and the load and which is closed in normal operation, opens automatically in the event of failure of this mains power supply in order to disconnect it from the load immediately, and it is then the inverter which supplies electrical power directly to this load. When this failure, which can normally only be temporarily on account of the limited capacity of the batteries, has been cleared, this static contactor recloses and the mains power supply again supplies the load, whereas it generally recharges the batteries via the inverter which operates in a reversible manner.

When the use is sensitive, it is important for the load to be isolated from the mains power supply very quickly in the event of failure of the latter. Consequently, a failure of the mains power supply has to be detected very quickly and a static contactor with high-speed opening has to be used.

Although the second condition does not cause any problem at present, due to the use for this static contactor of semiconducting components with turn-off capability (transistors, GTO . . . ) or turn-off assisted by an auxiliary circuit (thyristors), the same is not the case for high-speed detection of the mains power supply going outside its tolerances, which is the basis of the static conductor turn-off order. As the mains in fact supplies an AC voltage, it is not sufficient, for almost instantaneous detection of a failure, either to measure its peak voltage or to take into consideration the mean value of its rectified voltage, these two conventional processes generally giving rise to a detrimental delay.

SUMMARY OF THE INVENTION

The object of the invention is to overcome these drawbacks. According to the invention, the detection device for detecting almost instantaneously when the mains power supply goes outside preset tolerances comprises a generator producing an AC voltage of the same form and the same frequency as those of the mains power supply, with a fixed set amplitude, and controlled so as to be in phase with the mains supply voltage, comparison means for continuously comparing the instantaneous amplitudes of the mains supply voltage and of the generator output voltage and for making said static contactor open almost instantaneously when the difference between these two amplitudes exceeds a preset threshold.

In addition, means are provided for then detecting the return of the mains power supply to within its permissible tolerances, for then adjusting said generator in phase to the mains power supply, for checking this phase adjustment and the return of said voltage difference to below said threshold, and for then consequently reclosing the static contactor.

BRIEF DESCRIPTION OF THE DRAWINGS

The invention will be easily understood, and its advantages and other features will become more clearly apparent from the following description of an illustrative embodiment of the invention, given as a non-restrictive example only and represented in the accompanying schematic drawings, in which.

DESCRIPTION OF THE PREFERRED EMBODIMENT

Figure 1:
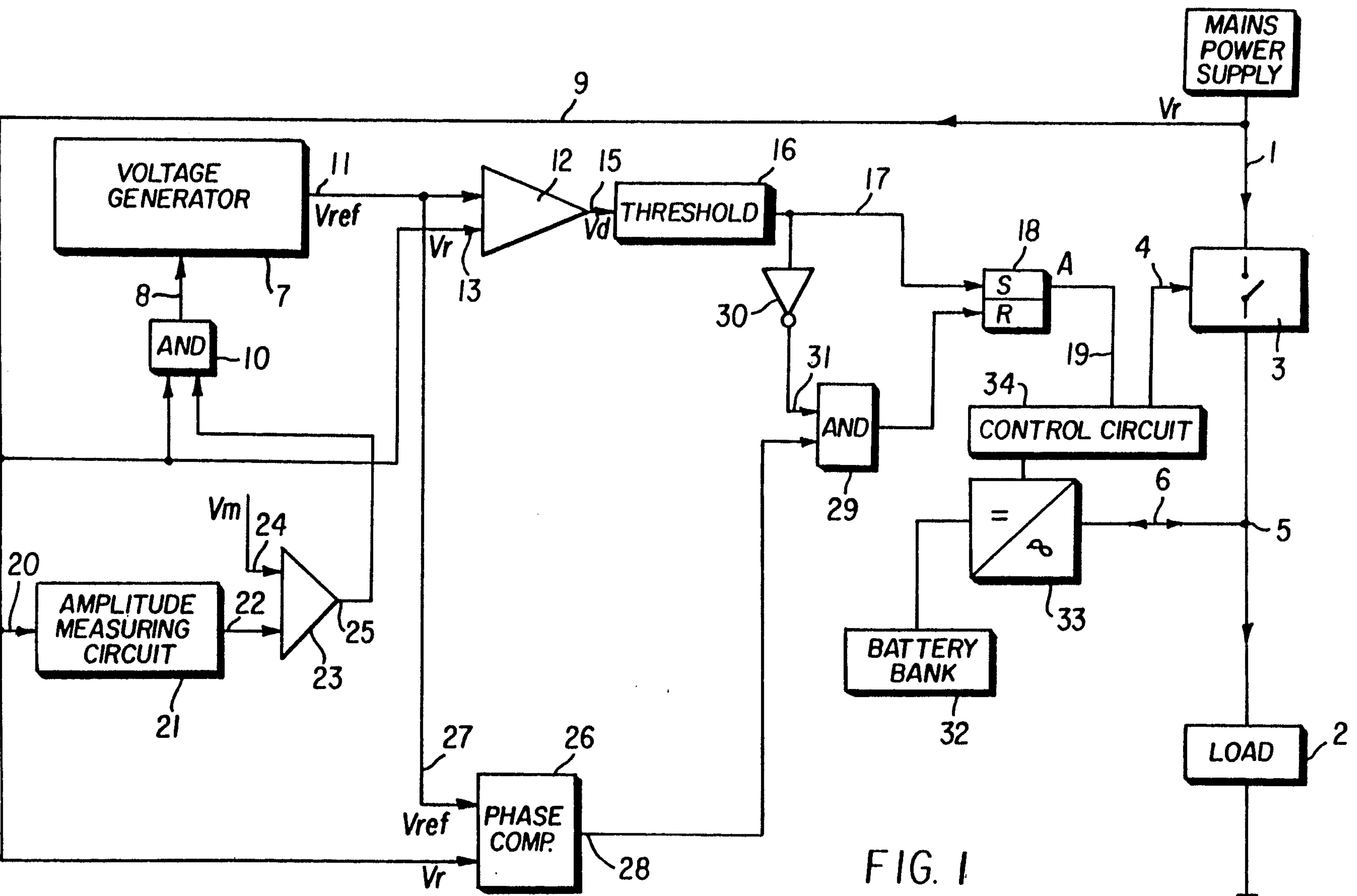
FIG. 1 is a block diagram of the high-speed detection device equipping the installation.

Referring to FIG. 1, reference 1 designates the input line of the AC mains supply, assumed here to be single-phase to simplify the drawing. The input line 1 supplies a load 2 via a static contactor 3, with GTO thyristors for example, which receives on a control input 4 an opening or closing control signal. An auxiliary back-up power supply comprises a bank of batteries 32 connected to an inverter 33 controlled by a control circuit 34. The auxiliary power supply is designed to apply at a point 5 of the conductor connecting the static contactor to the load, via a line 6, an AC voltage capable of replacing the mains power supply in the event of failure of the latter, i.e. in the event of it going outside the tolerance limits permissible by the load 2. In this case, the signal applied to the input 4 controls opening of the static contactor 3 in order to isolate the load 2 from the failed line 1: it is then the inverter that supplies power to the load via its output line 6. When the mains power supply is operating normally, the control signal applied to the input 4 is such that the static contactor 3 is closed, and the mains power supply supplies the load 2 and in addition supplies a recharging current for the battery, via the inverter line 6. In order to enable almost instantaneous detection of the mains power supply 1 going outside its tolerance limits, a voltage generator 7 is provided generating a sinusoidal voltage of the same frequency as that of the mains power supply and of fixed amplitude. This generator 7 is adjusted in phase to the mains supply voltage Vr by a phase regulation control 8 which receives the voltage from the mains supply line 1 via a conductor 9 and an "AND" circuit 10, whose function will be explained further on and which will, for the moment, be considered to be turned on.

Figure 2A:
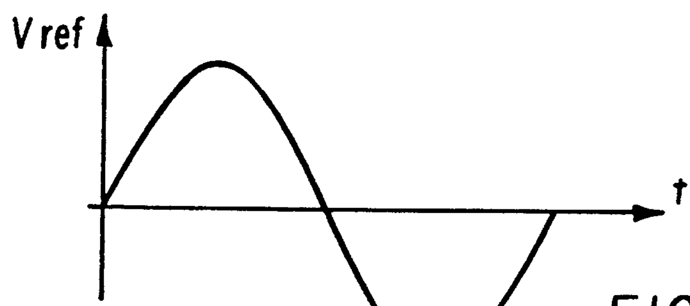
FIG. 2A illustrates the voltage output of the generator illustrated in FIG. 1.
Figure 2B:
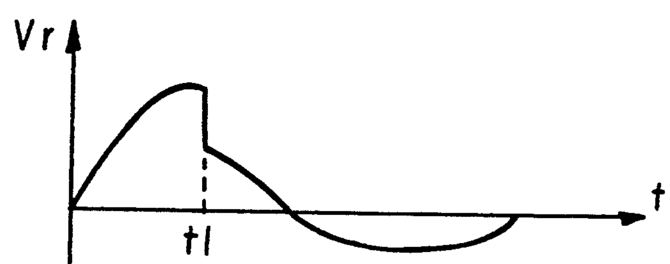
FIG. 2B illustrates the mains supply voltage.

This generator therefore supplies on its output 11 a sinusoidal voltage Vref, represented in FIG. 2A, in phase with that of the mains power supply, of the same period, and of fixed set amplitude, equal in this example to that of the AC mains supply 1. This voltage Vref is applied to a first input of a voltage comparator 12 which receives on its second input 13 the mains supply voltage Vr, via the above-mentioned conductor 9. This mains supply voltage Vr is represented in FIG. 2B, and is assumed to go outside its tolerance limits (dropping suddenly) at the time t1.

Figure 2C:
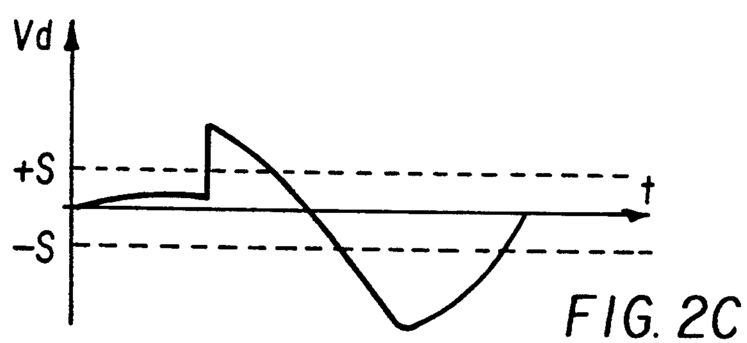
FIG. 2C illustrates the voltage applied to the threshold circuit illustrated in FIG. 1.

At the output 15 of the comparator 12 there therefore exists a voltage Vd which is the difference between the mains voltage Vr and the voltage Vref, and which is therefore appreciably nil in normal operating conditions. This voltage Vd is applied to a threshold circuit 16, whose "top" threshold +S and "bottom" threshold −S are represented in FIG. 2C, which illustrates the curve representative of this voltage difference Vd. The absolute value S of the threshold can, for example, be about 10% of the peak voltage of the reference voltage Vref.

Figure 2D:
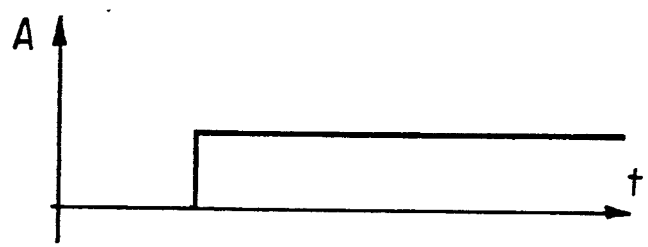
FIG. 2D illustrates the output of the threshold circuit illustrated in FIG. 1.

So long as the instantaneous difference Vd of the two above-mentioned voltages remains comprised between the two thresholds +S and −S, the output signal 17 of the circuit 16 is for example at level "0", so that a bistable switch 18 which receives the signal 17 at zero on an input S, supplies a signal A of level "0" on its output. The output signal of the switch 18 is represented in FIG. 2D. The output of the bistable switch 18 is connected, by a conductor 19, to the control circuit 34 of the inverter 33. The control circuit 34 then supplies on an output connected to the control input 4 of the static contactor a signal such that the static contactor remains closed. At the same time, the control circuit 34 controls the inverter 33 in such a way that it charges the battery 32.

At the time t1, the mains voltage Vr drops suddenly, so that the curve Vd (FIG. 2C) exceeds the threshold +S of the circuit 16. The switch 18 is then activated by the level "1" signal appearing on its input S, and its output A goes to level "1" (FIG. 2D), which results in almost instantaneous opening of the contactor 3, via the control circuit 34, at the time t1 corresponding to the mains voltage drop. Moreover, the control circuit 34 acts simultaneously on the chopping control of the inverter 33 so as to make the latter operate as a back-up power supply when the signal A is at level "1".

In order to make the system completely automatic, means are in addition advantageously provided for subsequently validating the return of the mains supply line 1 to within the tolerance limits. The static contactor 3 is only reclosed when the mains power supply and generator 7 have been rephased, and the above-mentioned voltage difference Vd (curve in FIG. 2C) has returned, in absolute value, below the value of the threshold S. This return does not have to be quick, since it does not matter if the inverter operates for a few moments more. In practice, the control circuit 34 closes the static contactor when these conditions are met and the mains voltage is in phase with the inverter output voltage, so as to minimize transition phenomena.

Consequently, the mains voltage Vr is applied by the conductor 9 to the input 20 of an amplitude measuring circuit 21, for example of the mean value, whose output 22 is applied to a voltage comparator 23 which receives on its other input 24 a preset reference voltage Vm determining the tolerance voltage: when the voltage Vmoy measured by the circuit 21 again reaches this reference voltage Vm, the mains supply is considered to have returned to normal. The signal at the output 25 of the comparator 23 then enables opening of the above-mentioned AND gate 10 (which closed beforehand at the time t1 in FIG. 2B), which validates the phase adjustment of the generator 7 to the mains voltage, via the control input 8.

A phase comparator 26, which receives the mains voltage Vr and, via a conductor 27, the output voltage Vref from the generator 7, supplies on its output 28 a level "1" when its input voltages Vr and Vref are in phase.

This output 28 is applied to an "AND" circuit 29 which receives on its other input 31 the output of the threshold circuit 16, inverted by means of a logic inverter 30: when the instantaneous difference Vd of the voltages of the mains supply and of the generator 7 has returned, in absolute value, below the value S, the output 17 is then at level "0", so that level "1" appears on the input 31. The gate 29 therefore opens and a switching impulse of the bistable switch 18 is applied to an input R of the latter, which results in the signal A applied to the control circuit 19 being reset to "0" state, and subsequently results in both closing of the static contactor 3 and modification of the inverter chopping so that it now serves the purpose of recharging the battery from the mains supply line 1, via the line 6.

We claim:

1. A system to supply AC electrical power to a load from a mains power supply, said system comprising an auxiliary back-up power supply capable of replacing a main power supply in the event of a mains supply failure, a static contactor located between the load and the mains power supply, a detection device for detecting almost instantaneously when the mains power supply goes outside preset tolerances and for controlling the opening of the static contactor, and means for detecting the return of the mains power supply to within said tolerances, wherein the detection device comprises a generator producing an AC voltage of the same frequency as that of the mains power supply, with a fixed set amplitude, and controlled so as to be in phase with the voltage of this mains power supply, comparison means for continuously comparing the instantaneous amplitudes of the mains supply voltage and of the output voltage of the generator and for making the static contactor open almost instantaneously when the difference between these two amplitudes exceeds a preset threshold.

2. The system according to claim 1, wherein the fixed set amplitude of the voltage supplied by the generator is selected appreciably equal to the voltage amplitude of the mains power supply.

3. The system according to claim 1, wherein said comparison means comprises a comparator whose output is connected to the input of a threshold circuit, the output of the threshold circuit being connected to an input of a bistable switch so as to supply on output of the switch a signal controlling the opening of the static contactor.

4. The system according to claim 1, further comprising control means for phase adjustment of the generator connected to the output of the means for detecting the return of the mains power supply, means for checking this phase adjustment, and control means for controlling the closing of the static contactor, when the generator is adjusted in phase to the mains power supply and the difference between the amplitudes of the mains supply voltage and the generator output voltage is, in absolute value, lower than said preset threshold.

5. The system according to claim 4, wherein the means for detecting the return of the mains power supply comprises a circuit for measuring the amplitude of the mains supply voltage and means for comparing this amplitude with a reference value.

6. The system to claim 4, wherein said means for controlling the phase adjustment of the generator to the mains supply comprises an AND gate, an input of which receives the mains supply voltage and the other input of which is connected to the output of the means for detecting the return of the mains power supply, the output of the AND gate being connected to a control input regulating the phase of the generator.

7. The system according to claim 4, wherein the means for controlling the closing of the static contactor comprise a bistable switch whose output is connected to the control input of the static contactor and whose zero reset input is connected to the output of the second AND gate, a first input of the second AND gate being connected to the output of the means for checking the phase adjustment and a second input of the second AND gate being connected, via an inverter to the output of the means for comparing the amplitudes of the mains supply voltage and the voltage of the generator.

* * * * *